(12) United States Patent
Wolfram et al.

(10) Patent No.: US 8,074,686 B2
(45) Date of Patent: Dec. 13, 2011

(54) TUBE FOR TRANSPORTING HIGH-VISCOSITY MATERIALS

(75) Inventors: Markus Wolfram, Nürtingen (DE); Knut Kasten, Nürtingen (DE); Raimund Mäckle, Esslingen (DE); Dietmar Müller, Herford (DE); Thomas Maurer, Lampertsheim (DE)

(73) Assignee: xperion GmbH, Herford (DE)

( * ) Notice: Subject to any disclaimer, the term of this patent is extended or adjusted under 35 U.S.C. 154(b) by 1068 days.

(21) Appl. No.: 10/542,730

(22) PCT Filed: May 14, 2004

(86) PCT No.: PCT/EP2004/005163
§ 371 (c)(1),
(2), (4) Date: Jul. 20, 2005

(87) PCT Pub. No.: WO2004/111518
PCT Pub. Date: Dec. 23, 2004

(65) Prior Publication Data
US 2006/0054231 A1 Mar. 16, 2006

(30) Foreign Application Priority Data
May 27, 2003 (DE) .................................. 103 24 321

(51) Int. Cl.
*F16L 9/00* (2006.01)
(52) U.S. Cl. ........ 138/109; 138/125; 138/127; 138/137; 138/146
(58) Field of Classification Search ............... 138/109, 138/125, 127, 137, 146
See application file for complete search history.

(56) References Cited

U.S. PATENT DOCUMENTS

| | | | |
|---|---|---|---|
| 2,219,047 A | | 10/1940 | MacLachlan |
| 3,347,571 A | * | 10/1967 | New ............................ 285/222.4 |
| 3,462,177 A | * | 8/1969 | Skinner et al. ............. 285/222.2 |
| 3,537,484 A | * | 11/1970 | McLarty ....................... 138/109 |
| 3,613,736 A | * | 10/1971 | Kuwabara ..................... 285/239 |
| 3,742,985 A | * | 7/1973 | Rubenstein .................. 138/141 |
| 4,142,554 A | * | 3/1979 | Washkewicz et al. ........ 138/125 |
| 4,267,863 A | | 5/1981 | Burelle |
| 4,366,842 A | | 1/1983 | Peavy et al. |
| 4,995,427 A | * | 2/1991 | Berchem ....................... 138/155 |
| 5,255,944 A | * | 10/1993 | Blin et al. ................... 285/222.2 |
| 5,368,669 A | * | 11/1994 | Maine et al. .................. 156/158 |
| 5,573,282 A | * | 11/1996 | Egner et al. ..................... 285/55 |

(Continued)

FOREIGN PATENT DOCUMENTS
DE 1 932 448 U 2/1966
(Continued)

*Primary Examiner* — James Hook
(74) *Attorney, Agent, or Firm* — Patent Central LLC; Stephan A. Pendorf

(57) ABSTRACT

Transport pipe for high viscosity materials, in particular for concrete. The transport pipe includes an inner pipe (10) made of an abrasion-resistant plastic, at least one metallic joint element (12), as well as a reinforcing jacket (14) which envelops at least the internal pipe. In order to ensure a reliable and enduring joint between inner pipe and joint element, it is proposed in accordance with the invention, that the radially projecting collar of the joint element is defined by a ring-shaped end face (20) and by a thereto joined ring step (22) extending radially towards the inside of the pipe and recessed axially from the ring-shaped end face, and wherein the plastic material of the inner pipe (10) engages in the ring step (22) from the inside of the pipe.

17 Claims, 5 Drawing Sheets

U.S. PATENT DOCUMENTS

| | | | |
|---|---|---|---|
| 6,155,302 A * | 12/2000 | Fischerkeller et al. | 138/109 |
| 2003/0205898 A1 * | 11/2003 | Baldwin et al. | 285/256 |
| 2005/0093293 A1 * | 5/2005 | Schwarz et al. | 285/247 |
| 2007/0157443 A1 * | 7/2007 | Baldwin et al. | 29/237 |

FOREIGN PATENT DOCUMENTS

| | | | |
|---|---|---|---|
| DE | 24 19 898 A1 * | 10/1975 | |
| DE | 195 22 540 A1 * | 1/1996 | |
| DE | 198 21 637 A1 * | 11/1999 | |
| DE | 199 14 668 A1 * | 11/2000 | |
| DE | 101 43 187 C1 | 4/2003 | |
| EP | 0 266 810 A2 * | 5/1988 | |
| FR | 2 197 140 A * | 3/1974 | |
| GB | 1 396 119 | 6/1975 | |

* cited by examiner

TUBE FOR TRANSPORTING HIGH-VISCOSITY MATERIALS

CROSS REFERENCE TO RELATED APPLICATION

This application is a national stage of PCT/EP2004/005163 filed May 14, 2004 and based upon DE 103 24 321.6 filed May 27, 2003 under the International Convention.

BACKGROUND OF THE INVENTION

1. Field of the Invention

The invention concerns a pipe (tube) for transporting high-viscosity materials, in particular concrete.

2. Related Art of the Invention

Mobile concrete pumps are frequently employed in the construction industry, wherein concrete is conveyed through transport pipes from a source location to an application location. The transport pipes are generally located on the mast arms of a distribution mast, wherein the movement of a terminal hose over a site to be concretized can be directed using remote control. Further, it is known to use stationary concrete pumps, in which transport pipes are laid along the ground from the source site to the site of application. Due to the abrasive characteristics of flowing liquid concrete, the transport pipe must be manufactured from an abrasion-resistant material. Conventionally steel pipes are used for this, of which inner surface has been hardened or coated with a abrasion-resistant material.

SUMMARY OF THE INVENTION

The present invention is concerned with the task of developing a pipe for transport of high-viscosity materials, in particular concrete, which is relatively light-weight and nevertheless able to withstand abrasion, and thus is particularly suited for mobile employment.

The inventive solution is based upon the idea, that by selecting a suitable combination of materials, a pipe with low structural weight can be developed, which nevertheless has a sufficient stability and abrasion resistance for transport of concrete with high bend stiffness. In order to accomplish this, in accordance with the invention the following combination of characteristics is proposed:
- an inner pipe made of an abrasion-resistant plastic, preferably polyurethane,
- at least one joint element, materially joined to the outside of an end of the inner pipe, the joint element including ring sleeve (appendage, fitting, projection) concentric to the inner pipe and axially extending from a radially projecting collar (flange),
- as well as a reinforcing jacket (casing, envelope) enclosing at least the internal pipe and connected thereto and to the joint element,
- wherein the radially projecting collar of the joint element is defined by a ring-shaped end face and by a thereto joined ring step extending radially towards the inside of the pipe and recessed axially from the ring-shaped end face, and wherein the plastic material of the inner pipe engages in the ring step (22) from the inside of the pipe.

The inventive transport pipes are pairwise joined to each other, with respective collars facing each other, by means of quick release couplings. With the proposed measures it is accomplished that the concrete situated in the transport pipes, although it may be able to penetrate into the separation gap between the end faces of two transport pipes joined to each other, however exerts or exercises no sheer forces on the flow between the inner pipe and the ring sleeve, which could lead to a release or peeling away of the inner pipe. If, in addition to this, at the recessed border of the ring step a slanted or curved transition surface extends in the axial direction away from collar, a which extends to the inner radius of the internally cylindrical ring sleeve, and if the inner surface of the cylindrical inner pipe exhibits an opening bevel or curvature diverging towards the collar, then it is thereby ensured that the flow forces of the inflowing thick material are translated into pressure forces between the inner pipe and the joint element, which counteract a releasing of the inner pipe.

A further important aspect of the invention is comprised therein that, by a form-fitting engagement between reinforcing jacket and joint element, no undesired changes in length can be caused by axial forces acting on the pipe. In order to accomplish this, it is proposed in accordance with the invention,
- that the ring sleeve of the joint element has an outer surface having an outer diameter which varies in the axial direction,
- and that the reinforcing jacket is formed by a fiber structure tightly wound externally on the inner pipe and the ring sleeve of the joint element, embedded in a plastic matrix, which cooperates form-fittingly, and in certain cases is materially fittingly joined, with the outer surface of the ring sleeve.

One particular advantage of the inventive transport pipe is comprised therein that it is exhibits a particularly low structural weight and nevertheless a sufficient bend resistance and pressure stability.

Further improvements are accomplished in this regard thereby,
- that the fiber structure is a fiber cable, fiber tape, fabric tape or mat,
- that the fiber structure contains fiber material selected from carbon fiber, glass fiber, aramide fibers and/or polyester fibers.
- that the fiber structure includes axially laid cross plies and/or radially laid circumferential plies or tiers,
- that the ring sleeve exhibits, running in the axial direction, a wave shape,
- that the ring sleeve exhibits in the axial direction a trapezoid shape, step shape, groove shape or knurled shape,
- that the joint element is provided with pins, and that the fiber structure is laid in the form of loops,
- that the reinforcing jacket and the joint element are bolted together,
- that the two ends of the inner pipe are respectively provided with a joint element with external wave shaped ring sleeves,
- that the ring sleeve of the joint element is tapered on its free end facing away from the collar,
- that the external or outer surface wave contour of the ring sleeve becomes flatter or more shallow towards its free end,
- that the external wave contour exhibits, joining directly axially to the collar, a sharp-edge radial returning wave valley,
- that from the wave valley next to the collar until the free end of the ring sleeve there are formed at least two wave peaks separated from each other by a further wave valley,
- and that the sequential adjacent wave peaks going towards the free end of the ring sleeve exhibit a decreasing radial height.

A sufficient wear resistance with regard to the abrasive viscous materials is achieved when the inner pipe is comprised of a polyurethane with, for example, a Shore A-hardness of 85-95. Therein it is particularly advantageous when the inner pipe is cast onto the joint element, preferably via an adhesion promoter or primer applied upon the joint element.

Likewise the fiber structure (roving) embedded in the plastic matrix, thereby forming a closed reinforcing jacket, can be joined form-fittingly, in certain cases via an adhesion promoter, with the inner pipe and/or with the joint element. The plastic matrix is preferably comprised of a reaction resin from the group consisting of epoxy resin, polyester resin, vinyl resin or a thermoplastic resin. The plastic matrix has the task of supporting the fibers and distributing the forces acting outwardly upon the pipe.

The inventive transport pipes, due to their low structural weight, are suitable for employment in mobile or stationary concrete pumps with concrete distribution booms or long transport distances which require a large number of transport pipes. The inventive transport pipes can, with the same weight, be constructed to be several times longer than the known transport pipes. The handling during the assembly and during laying of the pipes is thereby substantially facilitated.

BRIEF DESCRIPTION OF THE DRAWINGS

In the following the invention will be described in greater detail on the basis of the illustrative embodiment represented schematically in the figures. There is shown in FIG. 1 a section through a straight transport pipe with various joint elements.

DETAILED DESCRIPTION OF THE INVENTION

Figure 1:
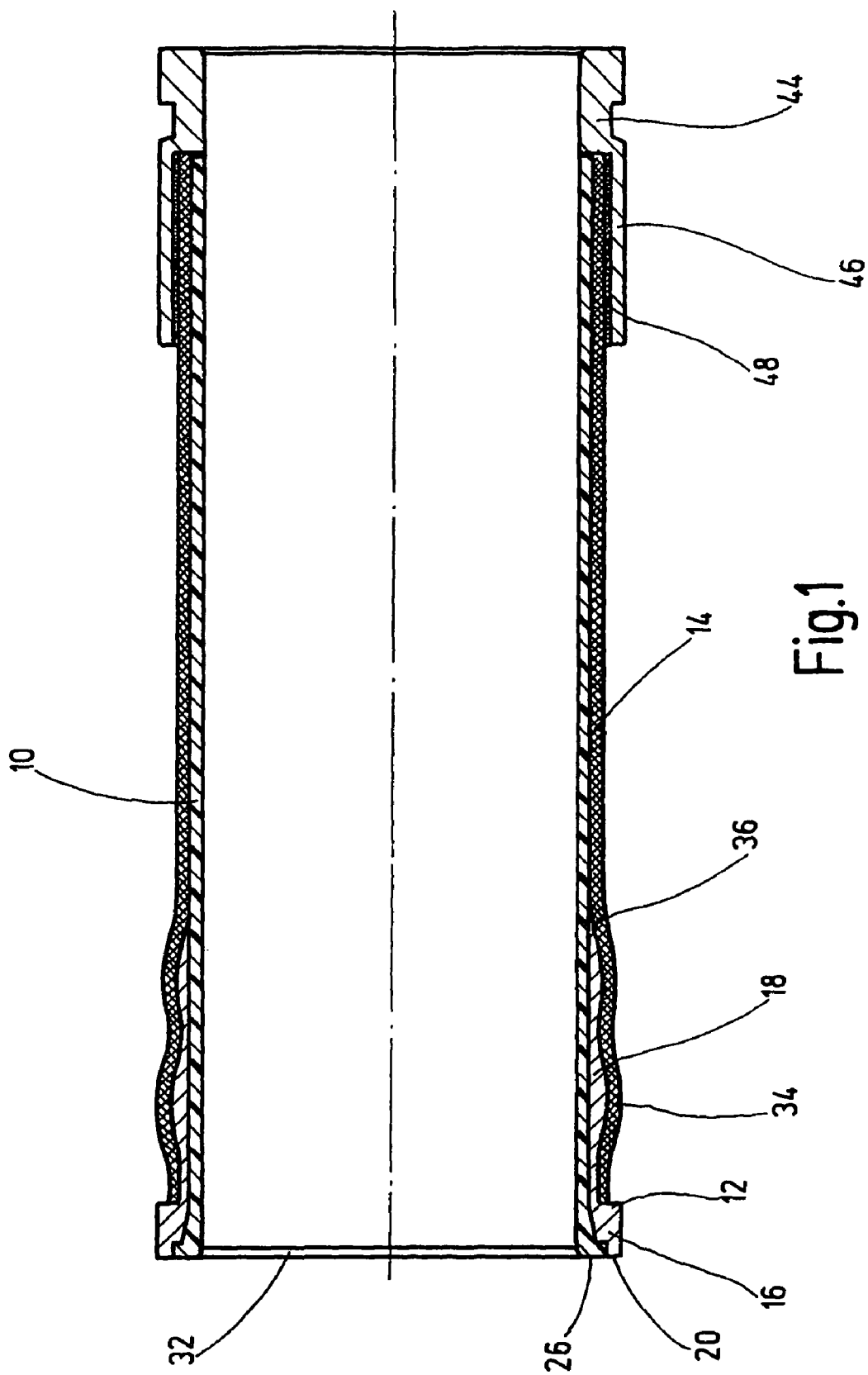

The composite pipes shown in the figures are intended as transport pipes for viscous materials, in particular for concrete for employment in concrete pumps.

The transport pipes are comprised essentially of an inner pipe 10 of wear resistant plastic material, for example polyurethane, joint elements 12 provided on the ends, as well as a reinforcing jacket 14 enclosing the inner pipe 10 and joined therewith and with the joint element. The ring-shaped joint element, comprised of metal, exhibits a collar 16 projecting radially at the end and a ring sleeve 18 joined axially and concentric to the inner pipe 10. For joining, a suitable ring clamp pipe connector is placed spanning about two flush contacting collars of transporting pipes, the ring clamp bridging over two collars and the gap from outside to join them to each other, while the ring sleeve 18 ensures a tight and durable joining between joint element 12 and the remaining parts of the transport pipe (inner pipe 10 and reinforcing jacket 14).

A unique feature of the embodiment shown in the figures is comprised in the joining sites shown on the left in FIG. 1 and as shown in FIGS. 2 through 5 between the joint element 12 and the inner pipe 10. The radially projecting collar 16 is there defined by an end face ring surface 20 and a ring step 22 axially recessed from the end face 20 and extending therefrom radially towards the pipe inside, wherein the plastic material of the inner pipe 10 engages from the pipe inside the free area 24 formed by the ring step 22 of the collar. The plastic material fills the free area 24 completely and forms an, on the end face 20 of the collar, aligned radially towards inwards connecting end face part 26. As can be seen particularly in FIG. 3, the recessed border surface of the step 22 joins, in the axial direction, a slanted or curved transition surface 28, which extends to the cylindrical inner surface 30 of the ring sleeve. Accordingly, also the inner surface of the cylindrical inner pipe 10 exhibits towards the end face part 26 a trumpet-like diverging opening bevel 32. The mentioned characteristics ensure that the liquid concrete flowing in the coupled transport pipes exerts no sheer forces on the joint location between inner pipe and collar which would lift or peel the inner pipe from the joint element. Any amount of viscous material which penetrates into the separation gap between the end faces 20 of two adjacent transport pipes would be immobile in the area of the separation gap between inner pipe and joint element, so that no wear or lifting forces engage at this location.

Figure 2:
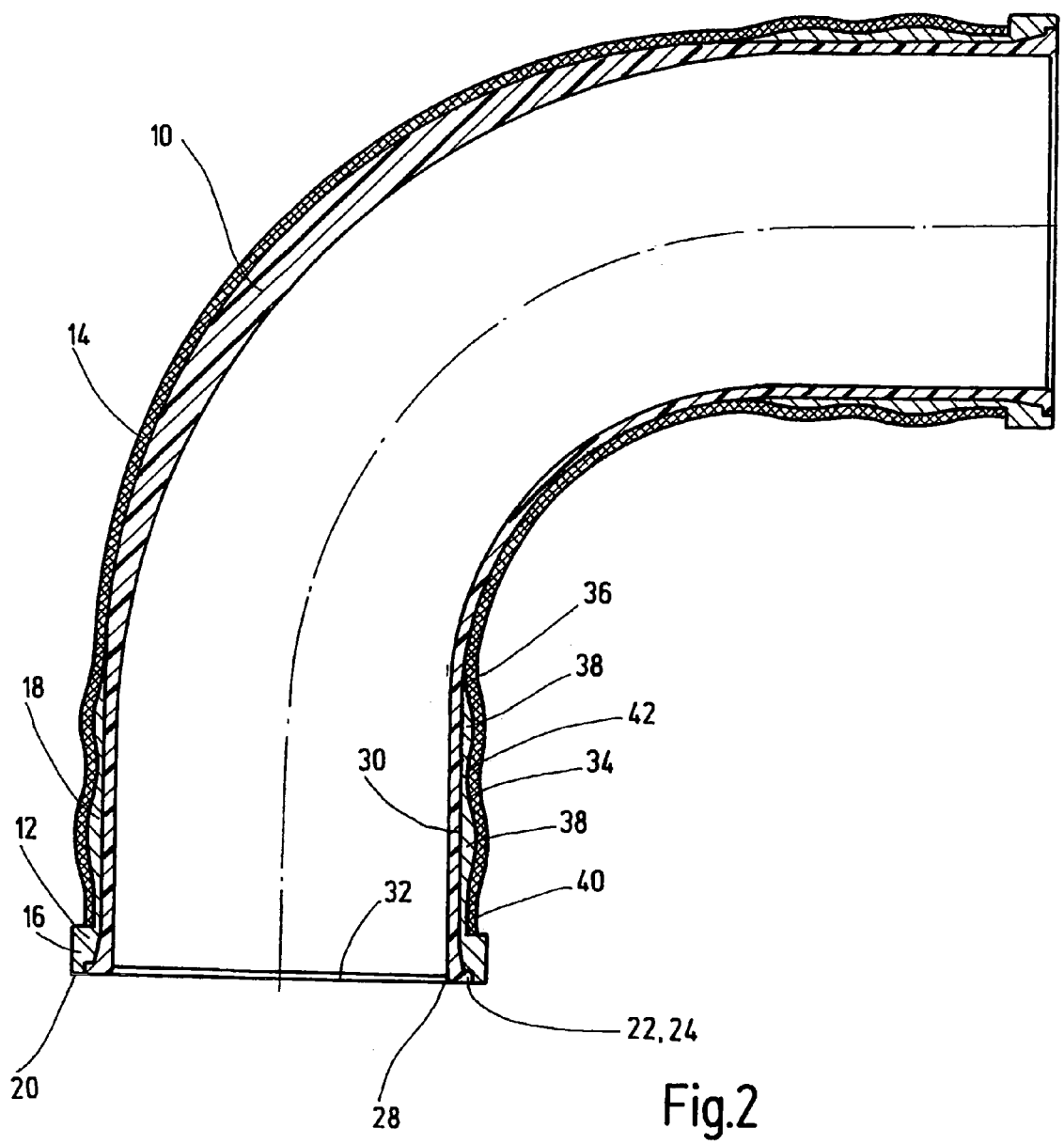
FIG. 2 a curved pipe with the same joint elements.
Figure 3:
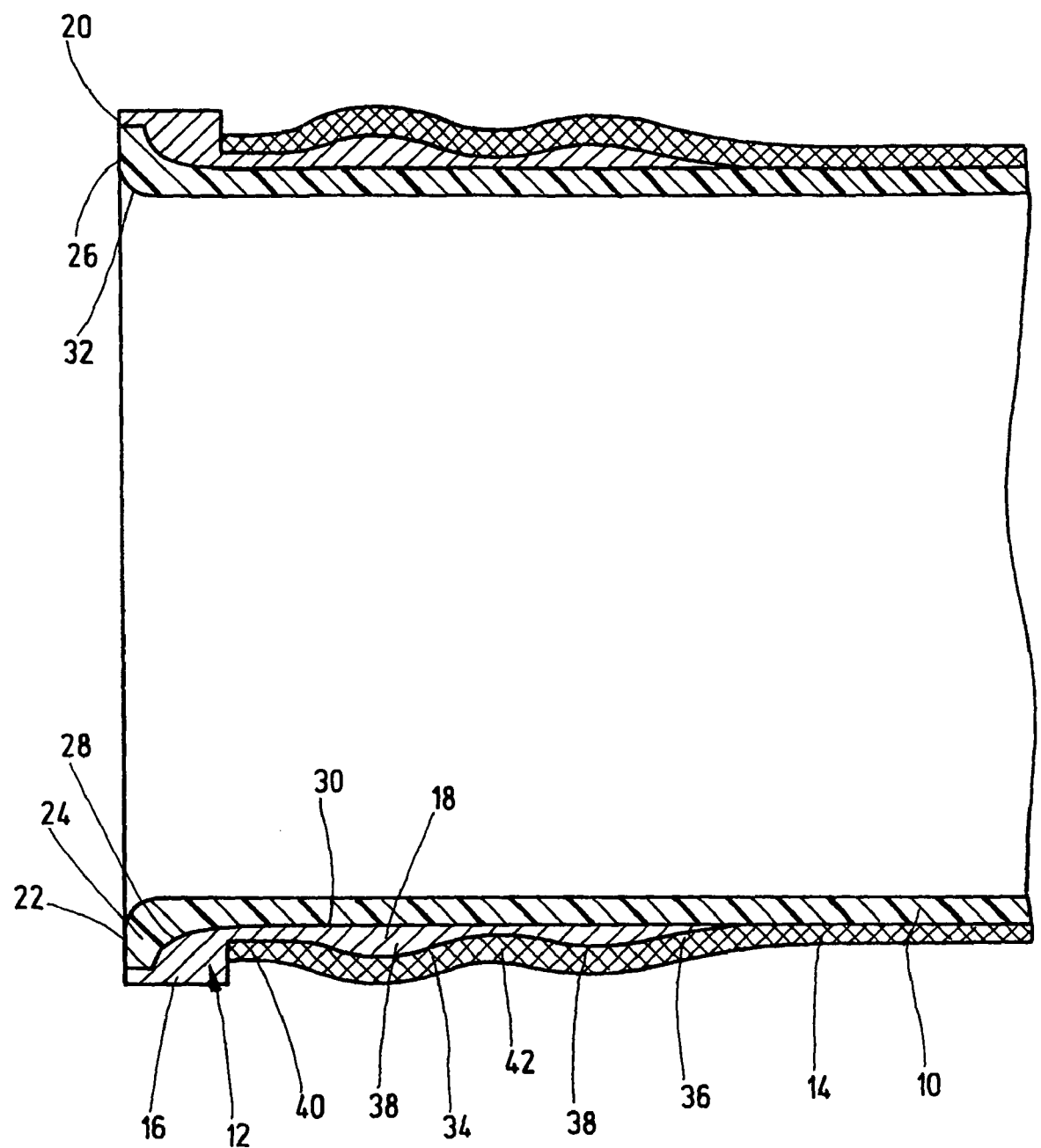
FIG. 3 an enlarged section of a transport pipe with joint element.

In the exemplary embodiment illustrated in FIGS. 1, 2 and 3 the joint element 12 exhibits on the ring sleeve 18 an axially wave-shaped outer surface 34, while the reinforcing jacket 14 is formed by carbon fiber cable or line (roving) tightly wound in the circumferential direction from the outside and close meshed upon the inner pipe 10 and the wave shaped ring sleeve 18, and embedded in the plastic matrix. The wound carbon fiber line is form-locking and form-fittingly joined with the wave shaped outer surface 34 of the ring sleeve 18. On its free end 36 away from the collar 16 the ring sleeve terminates tapered, so that a shallow transition is enabled for the wound reinforcing jacket 14 (see FIG. 3). Further, the outer wave contour 38 of the ring sleeve 18 becomes more shallow going towards its free end. The sequentially following wave peaks 38 of the wave contour 38 exhibit a decreasing radial height going towards the free end of the ring sleeve 18. Directly at the collar 16 there is joined or connected a sharp-edged radial returning wave valley 40, to which are joined, going to the free end 36 of the ring sleeve, two wave peaks 38 separated from each other by a further wave valley 42. Therefrom there results an optimal form fitting between ring sleeve 18 and outside lying reinforcing jacket 14, so that even with high axial stresses or loads no longitudinal enlargening of the transport pipe is to be feared. A further improvement in this respect is achieved thereby, that the inner pipe, in the course of manufacture, is cast onto the joint element 12, referably via an adhesion promoter or primer applied on the inner surface of the ring sleeve 18, while the carbon fiber line or cord embedded in the plastic matrix is form fittingly joined with the ring sleeve from the outside and with the inner pipe forming a closed reinforcing jacket.

The illustrative embodiment shown in FIG. 1 is provided with a wave shaped ring sleeve 18 only on the joint element shown on the left end. The joint element 44 shown on the right exhibits no wave structure on its ring sleeve 46. The outside of the cylindrical ring sleeve 46 is adhered with an adhesive layer 48 to the reinforcing jacket 14 of the transport pipe. This manner of construction is necessary in the case when an exact establishment of the pipe length is desired, which can be accomplished thereby, when the joint element 44 is subsequently or later adhered in a defined position on the still open pipe piece. With this construction of the transport pipe it is to be taken into consideration, that the left joint element 12 should be the entry side in a conveyor line, and the right joint element 44 should form the exit side. Only then is it ensured that the inner pipe 10 does not lift or peel from the joint element or from the reinforcing jacket by the viscous medium flowing by.

In the bent pipe shown in FIG. 2 joint elements 12 with wave shaped ring sleeve 18 are provided on the two ends. The direction of installment or assembly is in this case immaterial. It can be seen from FIG. 2 that the inner pipe 10 exhibits over the circumference a variable wall strength. On the outer side of the bent pipe the wall strength is greater than on the inner side. Therewith consideration is given to the varying material wear at the inner and the outer curvature of the bent pipe.

Figure 4:
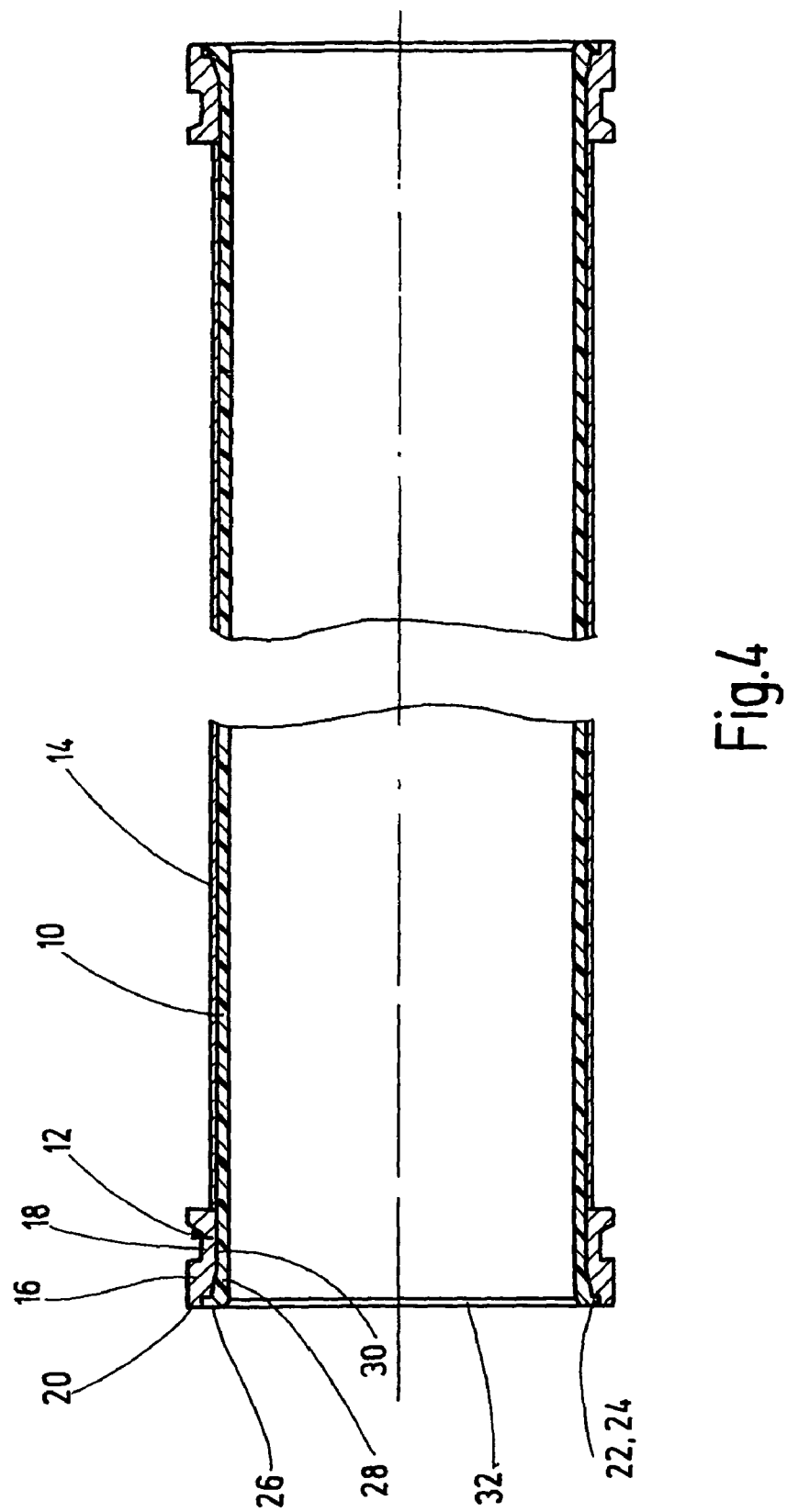
FIG. 4 a section through a straight steel pipe with internal pipe and joint elements welded to the end.
Figure 5:
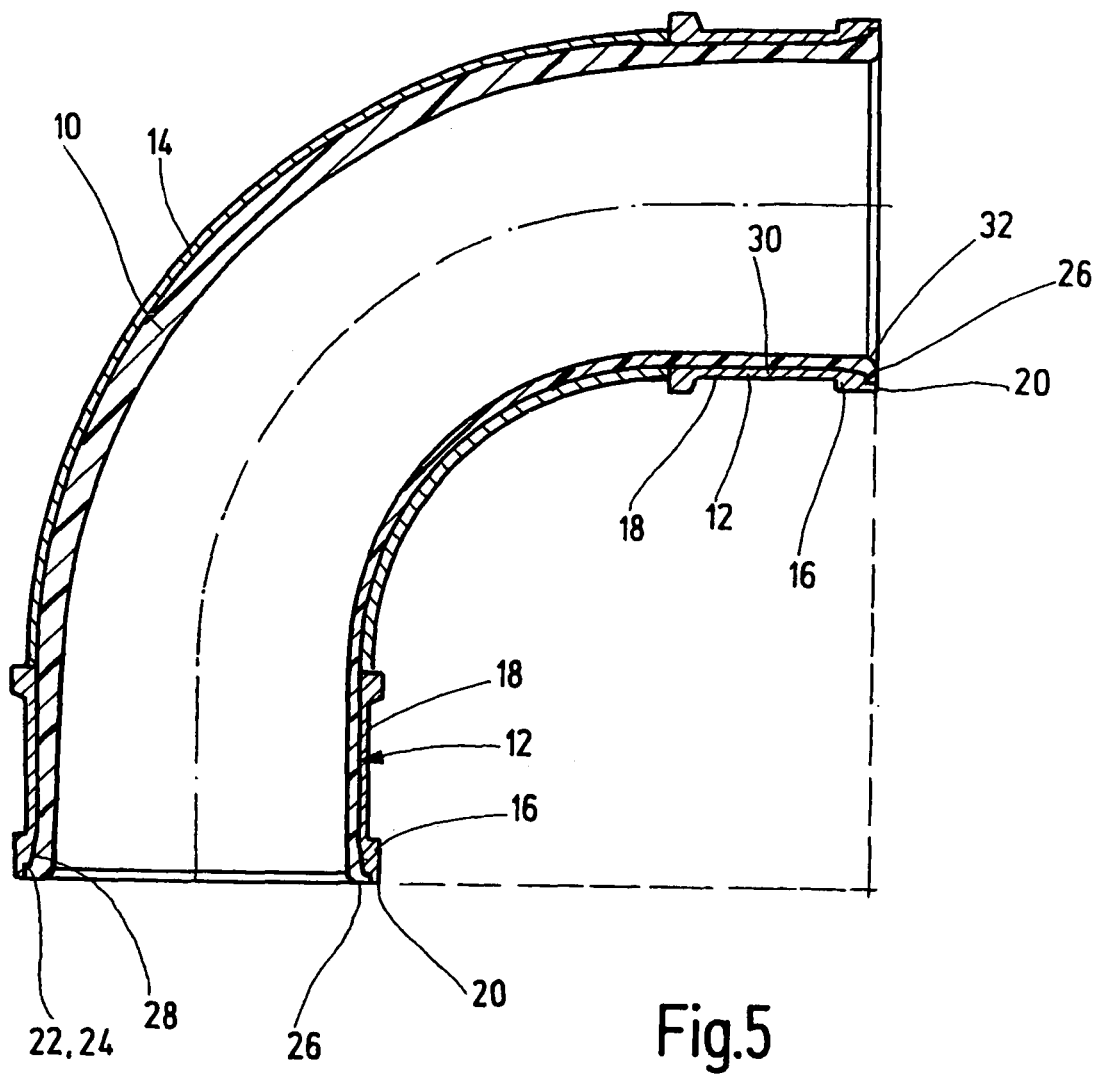
FIG. 5 a section through a bent pipe of steel with internal pipe and joint elements welded on the ends.

In the illustrative embodiments shown in FIGS. 4 and 5 the reinforcing jacket 14 is comprised of a pipe or bent pipe of steel. The joint elements 12 are there welded with their truncated back bearing ring sleeve 18 on an end of the steel pipe. On the inner side of the steel pipe 14 there is an inner pipe 10 of polyurethane forming an inner coating or layer. The inlet and outlet sides of the collar 16 and the inner pipe 10 are designed to be similar in the area of the ring step 22 as in the case of the illustrative embodiment according to FIG. 3. There also it is ensured by the suitable design in the area of the end phase parts 20, 26, that the liquid concrete flowing by exerts no material lifting sheer forces in the separation location between inner pipe 10 and joint element 12.

Example 1

The production of the inventive transport pipe occurs according to a first example embodiment in the following process steps:

At least one premanufactured metallic joint part comprising a collar and an externally wave shaped ring sleeve is introduced on one end of a casting mold and there cast with a reaction plastic which is wear resistant in the cured state, with formation of an inner pipe with a collar or flange on one end;

The finished internal pipe with collar or flange is wound about with a plastic impregnated carbon fiber cord from one end to the other with the formation of the externally wave shaped ring liner and formation of a cohesive reinforcing jacket;

The finished transport pipe is heated for a period sufficient for curing the plastic matrix and/or for production of a form fitting joint with the inner pipe and the joint element.

In order to achieve also between joint element and inner pipe a reliable material engaging joint, the joint element is coated with an adhesion promoter or primer on its contact surfaces with the inner pipe prior to the casting process. Likewise, the inner pipe and/or the joint element could also be coated with an adhesion promoter or primer on its contact surfaces with the jacket pipe prior to the wrapping process. The carbon fiber cord can be wound for example with a multi-axis winding machine with rotation of the inner pipe about the rotation axis. For this, the inner pipe with collar is seated fixed against rotation upon a spindle or winding core, while the winding core is rotated by motor about the axis of the inner pipe.

Example 2

According to a second embodiment, the production of the transport pipe occurs with the following steps:

At least one premanufactured joint element comprising a collar and a ring sleeve, wave shaped on the outside, is wound with a plastic impregnated carbon fiber cord to form a carbon fiber composite pipe;

Then the produced carbon fiber composite pipe is cleansed on its inside, and the joint element is cleanses on its free contact surfaces and coated with an adhesion promoter;

Subsequently a reaction plastic is introduced into the carbon fiber composite pipe with its at least one collar, forming an inner coating, and there is cured.

Fundamentally, after coating the adhesion material, a core with smaller dimension or diameter can be introduced into the inside of the carbon fiber composite pipe provided with at least one collar, leaving free of a ring gap, wherein the reaction plastic is introduced into the ring gap and is cured there, and subsequently the core is again removed.

Alternatively to this, the reaction plastic is sprayed upon the inner surface of the adhesion promoter coated carbon fiber composite pipe having at least one collar, or is centrifugally spun on and subsequently is cured to form the finished pipe. In the latter case no core is necessary.

In summary the following can be concluded: The invention concerns a transport pipe for high viscosity materials, in particular for concrete. The transport pipe includes an inner pipe 10 made of an abrasion-resistant plastic, at least one metallic joint element 12, as well as a reinforcing jacket 14 which envelops at least the internal pipe. In order to ensure a reliable and enduring joint between inner pipe and joint element, it is proposed in accordance with the invention that the radially projecting collar of the joint element is defined by a ring-shaped end face 20 and by a thereto joined ring step 22 extending radially towards the inside of the pipe and recessed axially from the ring-shaped end face, and wherein the plastic material of the inner pipe 10 engages in the ring step 22 from the inside of the pipe.

The invention claimed is:

1. A transport pipe for high viscosity materials, comprising:
    an inner pipe (10) made of an abrasion-resistant plastic,
    at least one joint element (12) materially joined to an external end of the inner pipe (10), which includes a radially extending collar (16) and a ring sleeve (18) concentric to the inner pipe (10) extending axially from one side thereof,
    a reinforcing jacket (14) enclosing at least the internal pipe and connected thereto and to the joint element (12), wherein the reinforcing jacket (14) is formed by a fiber structure impregnated in a plastic matrix, and wherein the fiber structure includes axially laid cross plies and/or radially laid circumferential plies or tiers,
    wherein the radially projecting collar (16) of the joint element (12) is defined by a ring shaped end face (20) and by a thereto joined ring step (22) extending radially towards the inside of the pipe and recessed axially from the ring-shaped end face (22),
    wherein the plastic material of the inner pipe (10) engages from the inside of the pipe in the ring step (22),
    wherein the ring sleeve (18) exhibits a wave shape running in the axial direction,
    wherein the wave peaks of the wave shape are presented on the exposed outer surface of the transport pipe, and
    wherein sequential wave peaks (38) of the ring sleeve (18) exhibit a decreasing radial height going towards the free end of the ring sleeve (18).

2. The transport pipe according to claim 1, wherein the plastic material of the inner pipe (10) fills the free area (24) bordered by the ring step (22) of the collar and thereby forms an on the end face (20) of the collar (16), radially inward, an end face part (26) aligned or joining flush.

3. The transport pipe according to claim 1, wherein the ring sleeve (18) of the joint element exhibits an outer surface (34) with outer diameter varying in the axial direction, and that the reinforcing jacket (14) is formed by a fiber structure impregnated in a plastic matrix and tightly cohesively wound externally on the inner pipe (10) and the ring sleeve (18) of the joint element (12), which reinforcing jacket (14) is connected with the outer surface (34) of the ring sleeve (18) form-fittingly and materially joined.

4. The transport pipe according to claim 3, wherein the fiber structure is fiber cable or thread, fiber tape, fabric tape or mat.

5. The transport pipe according to claim 3, wherein the fiber structure contains fiber material from the group consisting of carbon fiber, glass fiber, aramide fiber and/or polyester fiber.

6. The transport pipe according to claim 3, wherein the fiber structure includes fiber layers laid axially and/or radially.

7. The transport pipe according to claim 3, wherein the joint element (12) is provided with pins, about which the fiber structure is laid forming loops.

8. The transport pipe according to claim 3, wherein the reinforcing jacket (14) and the joint element (12) are bolted together.

9. The transport pipe according to claim 3, wherein the ring sleeve (18) of the joint element (12) becomes tapered on its free end opposite to the collar (16).

10. The transport pipe according to claim 3, wherein the wave contour of the outer surface of the ring sleeve (18), towards its free end, becomes more shallow.

11. The transport pipe according to claim 3, wherein the inner pipe (10) is comprised of wear resistant polyurethane.

12. The transport pipe according to claim 3, wherein the inner pipe (10) is cast on to the joint element (12).

13. The transport pipe according to claim 3, wherein the fiber structure embedded in the plastic matrix is materially joined with the inner pipe (10) with the formation of a closed reinforcing jacket (14).

14. The transport pipe according to claim 3, wherein for the plastic matrix a plastic material is selected from the group consisting of epoxy resin, polyester resin, vinyl resin, and thermal plastic resin.

15. The transport pipe according to claim 3, wherein the joint element (12) is comprised of a plastic molded part reinforced with fiber.

16. The transport pipe according to claim 1, wherein the joint element (12) is metal.

17. A transport pipe for high viscosity materials, comprising:
- an inner pipe (10) made of an abrasion-resistant plastic,
- at least one joint element (12) materially joined to an external end of the inner pipe (10), which includes a radially extending collar (16) and a ring sleeve concentric to the inner pipe (10) extending axially from one side thereof, as well as
- a reinforcing jacket (14) which envelops at least the internal pipe and is connected thereto and to the joint element (12), wherein the reinforcing jacket (14) is formed by a fiber structure impregnated in a plastic matrix, and wherein the fiber structure includes axially laid cross plies and/or radially laid circumferential plies or tiers,
- wherein the ring sleeve (18) of the joint element exhibits an outer surface (34) with outer diameter varying in the axial direction,
- wherein the reinforcing jacket (14) is formed by a fiber structure impregnated in a plastic matrix and tightly cohesively wound externally on the inner pipe (10) and the ring sleeve (18) of the joint element (12), which reinforcing jacket (14) is connected with the outer surface (34) of the ring sleeve (18) form-fittingly and/or materially joined,
- wherein the ring sleeve (18) exhibits a wave shape running in the axial direction,
- wherein the wave peaks of the wave shape are presented on the exposed outer surface of the transport pipe, and
- wherein sequential wave peaks (38) of the ring sleeve (18) exhibit a decreasing radial height going towards the free end of the ring sleeve (18).

\* \* \* \* \*